(12) United States Patent
Frank

(10) Patent No.: US 9,347,485 B2
(45) Date of Patent: May 24, 2016

(54) DEVICE FOR ROTATABLY COUPLING TWO COAXIAL CONNECTING ELEMENTS

(75) Inventor: Hubertus Frank, Höchstadt (DE)

(73) Assignee: IMO Holding GmbH (DE)

( * ) Notice: Subject to any disclaimer, the term of this patent is extended or adjusted under 35 U.S.C. 154(b) by 287 days.

(21) Appl. No.: 12/998,344

(22) PCT Filed: Oct. 9, 2009

(86) PCT No.: PCT/EP2009/007249
§ 371 (c)(1),
(2), (4) Date: Jun. 27, 2011

(87) PCT Pub. No.: WO2010/040539
PCT Pub. Date: Apr. 15, 2010

(65) Prior Publication Data
US 2011/0255815 A1    Oct. 20, 2011

(30) Foreign Application Priority Data

Oct. 9, 2008  (DE) .................... 10 2008 050 620

(51) Int. Cl.
| | |
|---|---|
| *F16C 19/14* | (2006.01) |
| *F16C 19/54* | (2006.01) |
| *F16C 19/38* | (2006.01) |
| *F16C 19/16* | (2006.01) |
| *F16C 41/00* | (2006.01) |
| *F16C 33/58* | (2006.01) |
| *F16C 19/18* | (2006.01) |

(52) U.S. Cl.
CPC ............. *F16C 19/381* (2013.01); *F16C 19/163* (2013.01); *F16C 33/581* (2013.01); *F16C 33/586* (2013.01); *F16C 41/001* (2013.01); *F16C 19/181* (2013.01); *F16C 2300/14* (2013.01)

(58) Field of Classification Search
CPC ...... F16C 19/16; F16C 19/163; F16C 19/181; F16C 19/381; F16C 19/545; F16C 33/581; F16C 33/586
USPC ......... 384/452–455, 510, 513, 537, 559, 569, 384/584, 585, 490
See application file for complete search history.

(56) References Cited

U.S. PATENT DOCUMENTS 3,652,141 A * 3/1972 Husten et al. ................. 384/455
4,422,697 A * 12/1983 Gugel et al. .................. 384/452
(Continued)

FOREIGN PATENT DOCUMENTS

| DE | 1904954 | 6/1970 |
| GB | 1220356 | 1/1971 |
| JP | 2005308091 | 11/2005 |

*Primary Examiner* — Phillip A Johnson
(74) *Attorney, Agent, or Firm* — Pandiscio & Pandiscio

(57) ABSTRACT

The invention is directed to a device for rotatably coupling two coaxial connecting elements, at least one of which is configured as a circular ring, and each of which has at least one annular surface that faces the corresponding surface of the respective other connecting element but is spaced apart therefrom by a gap, such that they are rotatable in opposite directions about an imaginary axis (axis of rotation) at the center of the annular connecting element and approximately perpendicular to the ring plane, wherein disposed in the gap between the two connecting elements is a rotary joint, configured as a single- or multi-row rolling bearing, for absorbing axial and radial loads and tilting moments, wherein at least one annular connecting element comprises, on its surface facing the gap, a continuously circumferential, planar shoulder having an oblong or elongated cross section and extending away from the gap to a freely terminating, peripheral circumferential edge.

31 Claims, 2 Drawing Sheets

(56) References Cited

U.S. PATENT DOCUMENTS

| | | | |
|---|---|---|---|
| 4,828,405 A * | 5/1989 | Sinner | 384/455 |
| 4,906,112 A * | 3/1990 | Gobel et al. | 384/548 |
| 5,074,677 A * | 12/1991 | Andree et al. | 384/448 |
| 5,971,619 A * | 10/1999 | Bourgeois-Jacquet et al. | 384/448 |
| 6,543,938 B2 * | 4/2003 | Dittenhofer | 384/455 |
| 7,637,664 B2 * | 12/2009 | Kiyosawa et al. | 384/455 |

* cited by examiner

DEVICE FOR ROTATABLY COUPLING TWO COAXIAL CONNECTING ELEMENTS

BACKGROUND OF THE INVENTION

1. Field of the Invention

The invention is directed to a device for rotatably coupling two coaxial connecting elements, at least one of which is configured as a circular ring, and each of which has at least one annular surface that faces the corresponding surface of the other connecting element, but is spaced apart therefrom by a gap, such that the connecting elements are rotatable in opposite directions about an imaginary axis (axis of rotation) at the center of the annular connecting element and approximately perpendicular to the ring plane, wherein disposed in the gap between the two connecting elements is a rotary joint, configured as a single- or multi-row rolling bearing, for absorbing axial and radial loads and tilting moments.

2. Description of the Prior Art

Such rotary joints are used in an extremely wide variety of fields and an extremely wide range of sizes. Although the term "ball bearing" still tends to evoke concentric rings a few centimeters in diameter, rolling-bearing rotary joints of this kind now range up to eight meters in diameter. The circumference is then as much as 25 meters, comparable to the length of a passenger car on a train. All the same, for reasons of weight, the cross section of a ring should usually be no more than 100 to 200 square centimeters. Such delicate rings are not inherently rigid enough to counteract elliptical deformation, for example, especially since tremendous forces and/or torques can occur during operation. Each of the two rings is usually provided with coronally arranged fastening bores that serve to frictionally secure it to a support structure. This support structure must then be able to absorb any deformation forces that occur and to withstand them without noticeable deflection. If, for whatever reason, the structure is not able to provide the desired mechanical rigidity, then it is nearly impossible to introduce forces into the rings or have them absorb forces in order to counteract undesired deformation, and the design engineer is confronted with a nearly insoluble structural problem.

From these disadvantages of the described prior art arises the problem initiating the invention, that of improving a rotary joint of this kind in such a way that it becomes possible to introduce forces into the rings or have them absorb forces so as to counteract undesired, for example elliptical, deformation of the rings.

SUMMARY OF THE INVENTION

The solution to the stated problem is achieved by the fact that at least one annular connecting element carries, on its surface facing the gap, a continuously circumferential, planar shoulder having an oblong or elongated cross section and extending away from the gap to a freely terminating, peripheral circumferential edge.

Such a shoulder, as used here, does not overlap with the connecting surface of the particular ring, so the mounting of the latter is not hindered. On the other hand, the shoulder is in contact with, and braces, a ring of the rotary joint, and can therefore exchange forces with it. In addition, the shoulder—particularly by its freely terminating, peripheral circumferential edge and the surface regions adjacent thereto—forms a convenient way of absorbing forces and/or torsional, tilting or bending moments, or exchanging them with one or more other devices. Particularly in the case of an axial bearing, a planar shoulder according to the invention could be configured as a continuously circumferential skirt or a cylinder-jacket-shaped barrel surface; in general, however, it does not conform to the jacket of a cylinder or of a cone, but is configured as a planar circular ring intersected perpendicularly by the axis of rotation of the rolling bearing.

The invention particularly allows of an improvement in that at least a portion of the planar shoulder, particularly in the region near its peripheral circumferential edge, is configured as one or more rotationally symmetrical contact surfaces for brake shoes. Such brake shoes can be used in the manner of a disk brake, to generate a braking force between the rings. In this way, a parking brake, or even a dynamic brake, can be created with the simplest means, to actively and quickly brake relative rotation between the rings as needed. In the case of relatively large installations, for example, this eliminates the need for expensive frequency converters with energy recovery systems, or the like. In this connection, the surface of the peripheral, i.e. free, circumferential edge of the shoulder according to the invention need not be smooth. It could also have a regular or irregular structure, for example equidistant ribs, or the like. Care should be taken, however, to ensure that the ring, as a whole, is balanced to some degree.

Since the planar shoulder is formed in one piece with the particular annular connecting element, large (braking) forces can also be transmitted without difficulty to the connected ring.

It has proven advantageous for the radial distance between the peripheral circumferential edge of the shoulder and the nearest rolling-element raceway to be smaller than the distance of that raceway from the axis of rotation of the rolling bearing. A dimensional rule of this kind ensures that the thickness extent of the continuously circumferential shoulder, measured radially to the axis of rotation, is small in relation to the diameter of the rolling bearing, and thus does not interfere with the operation of other parts and devices of the machine concerned.

The invention recommends disposing the planar shoulder at a jacket surface of the particular annular connecting element that faces away from the gap. There, it can extend in a radial direction straight away from the particular jacket surface.

The invention is further optimized if the planar shoulder has in the region of its peripheral circumferential edge a thickened region that is connected, via a web that is thinner than it is, to the particular annular connecting element. This thickened region has a higher rigidity than the web extending from it to the actual annular connecting element. Taken together, these three elements—the thicker and thinner regions of the continuously circumferential shoulder and the annular connecting element itself—have a cross section through their periphery that is approximately H-shaped. The circular-disk-shaped center web is thus given considerable reinforcement, similar to that of an I-profile, by the two continuously circumferential thickenings at its two annular circumferential lines—one of which is formed by the actual connecting element itself—with a minimal increase in weight.

The two mutually opposite boundary surfaces of the thickened region, particularly its top and bottom sides, should extend parallel to each other. This greatly simplifies not only production, but also any braking system that may be present, since disks of uniform thickness and brake shoes that fit against them are relatively easy to manufacture.

The same applies to the two mutually opposite boundary surfaces, particularly the top and bottom sides, of the web connecting the thickened region at the peripheral circumferential edge to the particular annular connecting element;

these should also extend parallel to each other, and preferably in an exactly radial direction relative to the axis of rotation of the rolling bearing.

Dimensioning of this kind constitutes an optimal compromise between maximal rigidity, on the one hand, and minimal weight, on the other. High deformation rigidity is an important property for the inventive shoulder in particular, to prevent imbalances that might lead to vibrations or even wobbling.

Particular advantages are gained if the lengths of the cross sections of the thickened region and of the web, measured in the longitudinal direction of the shoulder cross section, are approximately equal:

$$(I_{pB}-I_{St})/(I_{pB}+I_{St}) \le k_1,$$

where $I_{pB}$=the radial length of the cross section of the thickened peripheral region;

$I_{St}$=the radial length of the cross section of the web between the thickened peripheral region and the particular annular connecting element;

$k_1$=for example 0.25, preferably 0.2, particularly 0.15.

By choosing the radial lengthwise extent of the tapered or thinner web region so that it is not too large, the bending moments arising at the annular ends of this web region can be limited to non-hazardous values.

Another dimensioning rule provides that the extent which the annular connecting element possesses parallel to the longitudinal direction of the cross section of the thickened region to which it is connected is approximately equal to or greater than the length of the thickened region:

$$I_{rA} \ge I_{pB}$$

where $I_{rA}$=the lengthwise extent which the annular connecting element connected to the planar shoulder possesses parallel to the longitudinal direction of the cross section of the planar shoulder.

The radial thickness of the rigidity-increasing thickened region of the shoulder is thereby limited, on the one hand to avoid excessively increasing the moment of inertia of any masses of the rotary connection that are to be accelerated, and, on the other hand, to limit their overall size and weight to acceptable values.

Based on the same considerations, a similar but still more stringent limitation is placed on the cross-sectional dimensions of the continuously circumferential shoulder by the fact that the extent which the annular connecting element possesses parallel to the longitudinal direction of the cross section of the thickened region to which it is connected, is smaller than or approximately equal to, the length of the cross section of the planar shoulder:

$$k_2 \cdot I_{rA} \le I_f [\text{sic}]$$

where $I_{fA}$=the length of the planar shoulder ($I_{fA}=I_{pB}+I_{St}$)

$k_2$=for example 0.85, preferably 0.9, particularly 0.95.

It is within the scope of the invention that the thickened peripheral region is at least twice as thick as the web connecting it to the particular annular connecting element, preferably at least 2.5 times as thick, particularly approximately 3 times as thick. This results in a very rigid structure with a distinctly pronounced H-shaped cross section at the periphery.

On the other hand, the heightwise extent of the thickened peripheral region, i.e., the extent parallel to the axis of rotation, should be no greater than the height of the particular annular connecting element itself (i.e., the annular connecting element connected directly to it), for example, equal to or less than three-fourths of the height of said connecting element, preferably equal to or less than two-thirds of the height of said connecting element, particularly equal to or less than one-half the height of said connecting element. It has been found better to instead increase the radial extent of the thickened region until that portion of the shoulder has an approximately square cross section:

$$0.8 \le I_{pB}/d_{pB} \le 1.2,$$

where $d_{pB}$=the thickness of the cross section of the thickened peripheral region.

Here again, this dimensioning helps to establish a balance between rigidity, weight and moment of inertia.

Furthermore, in the region(s) of transition from the web to the adjacent area of the thickened region, on the one side, and/or of the particular annular connecting element, on the other side, the cross-sectional radius, or radii of curvature, should be greater than 1 mm, preferably greater than 2 mm, particularly greater than 3 mm. This prevents notch effects in these regions, thus guaranteeing optimal service life even under heavy-duty operating conditions.

It has proven beneficial for the two annular connecting elements to be disposed one inside the other, preferably in such a way that the main direction of the gap running between them approximately follows the jacket of a cylinder. This gives the assembly as a whole a minimal overall height.

This overall height also preferably is not increased, or at least is not substantially increased, by the shoulder according to the invention, in that its heightwise extent parallel to the axis overlaps 80% or more, preferably 90% or more, particularly completely, with at least a respective one of the annular connecting elements.

The height of each annular connecting element, measured in the direction of the axis of rotation of the rolling bearing, is often smaller than the parallel overall height of the rotary joint; for example, the two annular connecting elements are usually offset from each other very slightly in the axial direction, particularly such that two preferably planar surfaces presented by the annular connecting elements and separated from each other only by the gap are mutually offset in the axial direction. The distance between these surfaces, each of which juts out in the axial direction, defines the overall height of the rotary joint if the shoulder according to the invention does not anywhere protrude past the two surfaces respectively jutting out in the axial direction.

The surfaces of the two annular connecting elements that respectively jut out in the axial direction also define the preferred connecting surface of each, the preferred connecting surface of one connecting element being on the top side of the rotary joint and the preferred connecting surface of the other connecting element on the bottom side of the rotary joint.

If the shoulder according to the invention is disposed completely between the respective planes defined by each of these two connecting surfaces, the rotary joint obtains a minimal overall height. In this case, the invention further provides that the distance of the planar shoulder from the preferred connecting surface of the annular connecting element connected to it, measured in the direction of the axis of rotation of the rolling bearing, is equal to or greater than its distance from the opposite end face of the particular connecting element. This generally facilitates the installation of such a rolling bearing, in that the shoulder can be grasped from below while the connecting element connected to it is being secured to the machine part, or system part, provided for this purpose, and/ or permits visual inspection to check that the ring and the machine part or system part are properly aligned.

The invention further introduces the possibility that an annular connecting element that is not joined in one piece to the planar shoulder, or a portion of such an annular connecting element that is separated from the planar shoulder in such a way, can be provided with a circumferential toothing. Such toothing permits active rotary driving and thus active rotational adjustment of the two rings of such a bearing, and therefore, in a sense, forms a counterpart to the inventive shoulder that can be used to brake and stop the two oppositely rotatable rings.

Such toothing can be disposed on the jacket surface of the rotary joint facing away from the planar shoulder. In that case, almost the entire jacket surface of a ring of the rotary joint could be toothed completely, i.e. to its full height, thus—in combination with a suitably thick drive sprocket, drive pinion or drive worm—reducing the tooth flank load as much as possible.

In this case, of course, the chassis of an active braking device, for example one equipped with brake shoes, would have to be disposed on the respective other machine part from the drive motor. This means that at least one of these two connecting elements (which naturally can also be present in a plurality, for example plural drive sprockets or drive worms or braking devices distributed over the circumference) would have to be secured to a machine part or system part that rotates during operation. This might sometimes cause power feed problems. In such cases, it might be better to dispose circumferential teeth on the same annular connecting element as the inventive shoulder. If this connecting element is connected to a rotatable machine part, or system part, during installation, while the other one is connected to a stationary foundation or chassis, then the driving and the braking devices can both be disposed on this same foundation or chassis, where there would be no problem using cables or hoses to supply power.

So that the brake shoes can be applied to the shoulder, thus serving as a brake disk, the toothing should be an axial distance from the planar shoulder that is equal to, for example, at least 8 mm, preferably 10 mm or more, particularly 15 mm or more.

Another way of keeping the movement space of the brake shoes clear is to shift the toothing relative to the planar shoulder in a radial direction backward toward the particular annular connecting element. The brake shoes can then be applied to the inventive shoulder beyond the toothing.

In at least one end face of at least one connecting element—a so-called connecting face—there should be provided coronally arranged fastening means for securing that connecting element to a system part. Particularly suitable choices for such fastening means are bores, into or through which screws, bolts, threaded bolts, or the like, can passed. These bores should either be configured as through-passing from one end face to the other, and/or should have an internal thread. A preferred location for such fastening means, for example bores, is sited radially between a toothing and the actual rolling bearing or particular rolling-element raceway, to the extent that these elements are worked into opposite jacket surfaces of a common body of revolution, for example milled into them or worked in in some other way.

The invention can be employed in rotary joints having one or more rolling-element rows, preferably at least two rolling-element rows, particularly three rolling-element rows.

At least one rolling-element row can contain ball-shaped rolling elements, but one or more rows comprising roller-, needle-, barrel- or cone-shaped rolling elements may be contemplated.

If more than one rolling-element row is present, at least two rolling-element rows should be mutually offset, particularly in the axial direction, for example to be able to absorb and transmit tilting moments.

To prevent the ingress of foreign bodies into the rolling-element raceways, it is provided according to the invention that the gap between the two annular connecting elements is sealed along at least one linear mouth region, particularly at both mouth regions, by at least (a respective) one annular sealing element. This can be constituted by at least one elastic sealing ring, which is secured to one connecting element and whose sealing lip is pressed elastically against the other connecting element.

Finally, it is within the teaching of the invention that the preferably sealed, gap-shaped cavity between the two annular connecting elements is filled with a lubricant. Although oil can also be considered for this purpose, as a general rule the invention gives preference to grease, since this substance finds its way to all points of the rolling-element raceways and therefore coats all the rolling elements and their raceways evenly, regardless of the orientation of the bearing.

BRIEF DESCRIPTION OF THE DRAWINGS

Additional features, characteristics, advantages and effects based on the invention will emerge from the following description of preferred embodiments of the invention and by reference to the drawing. Therein.

DESCRIPTION OF THE PREFERRED EMBODIMENTS

Figure 1:
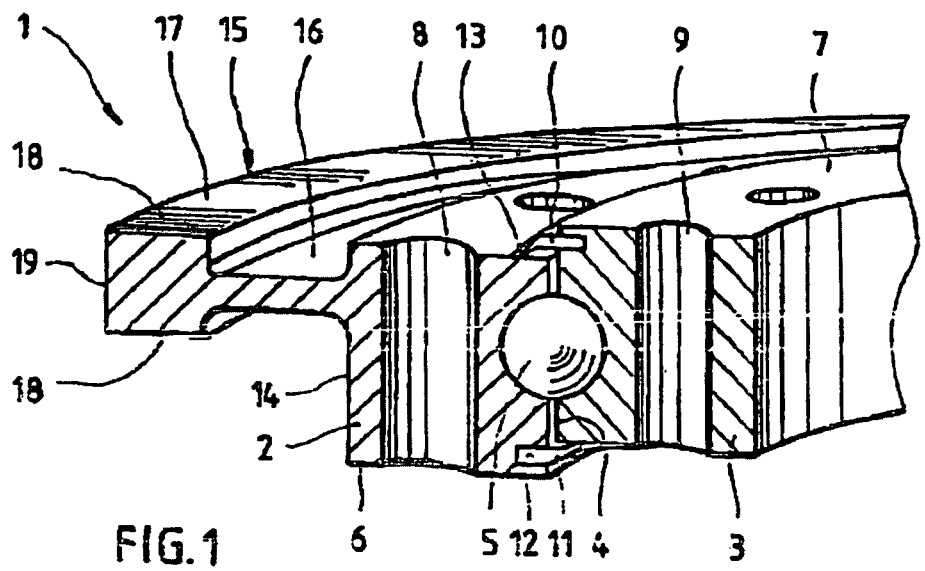
FIG. 1 is a cross section through the annular connecting elements of a first embodiment of the invention.
Figure 2:
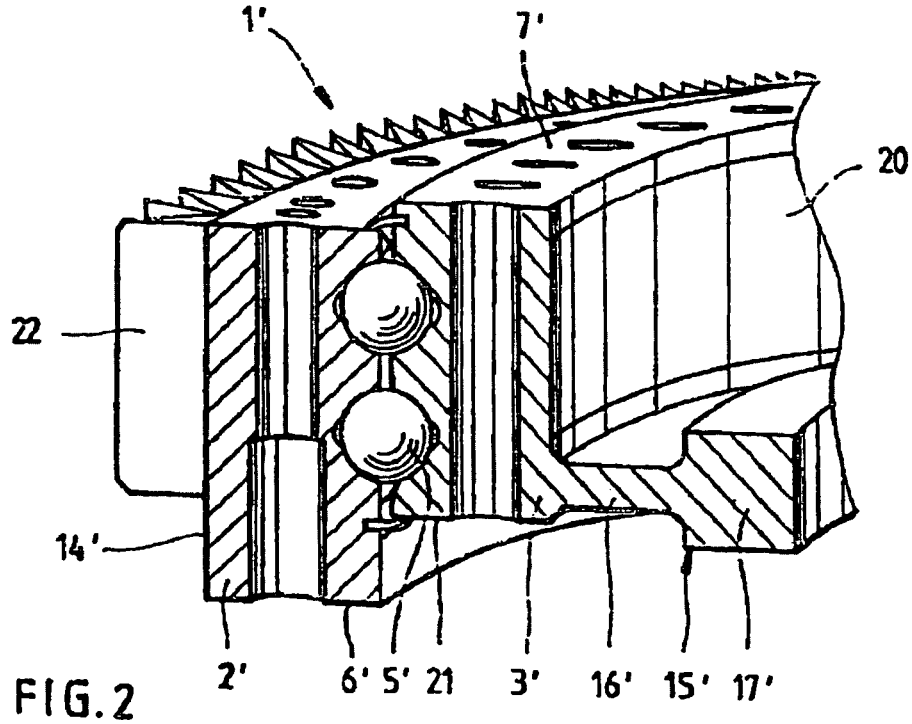
FIG. 2 is a representation analogous to FIG. 1 of a second embodiment of the invention.

The device 1 according to the invention depicted in FIG. 1 is a sort of minimal embodiment. It is comprised of a rotary joint having an outer ring 2 and an inner ring 3 concentric therewith. The two rings 2, 3 are separated from each other by a gap 4 and are rotatable in opposite directions. Ease of rotational movement is ensured by a row of ball-shaped rolling elements 5 that roll between two raceways disposed on that lateral surface of each ring 2, 3 which faces the gap 4. The individual rolling elements 5 can be held at equal distances by spacers and/or by a cage.

The two rings 2, 3 have approximately the same height parallel to the axis of rotation of the rotary joint, but are offset from each other slightly in the axial direction. Thus, neither the top nor the bottom sides of the two rings 2, 3 lie in a common plane. Instead, in the illustrated embodiment, the bottom side of a first connecting element 2—that of outer ring 2, in the case illustrated—is lower down than that of the respective other one, namely inner ring 3, and forms a first planar and annular connecting surface 6 for securing the particular outer connecting element 2 to a foundation, chassis, or other machine part or system part. By the same token, the top side of the other connecting element—that of inner connecting element 3, in this case—protrudes past that of the first connecting element 2, and forms an also annular connecting surface 7 for securing the particular inner connecting element 3 to a machine part or system part.

Both rings have axially parallel bores 8, 9 passing through them, through which screws, bolts, or the like, can be passed in order to frictionally secure the particular connecting surface 6, 7 to a foundation, chassis, machine part, or system part.

A respective seal 10, 11 engages over the gap 4 at each annular mouth and seals it. Both of the annular seals 10, 11 preferably consist of an elastic material. Each of them is secured to a respective connecting element 2, 3, for example in a continuously circumferential groove 12 on the lateral surface of a connecting element 2, 3 facing the gap, just below the particular connecting surface 6, 7. Whereas a circumferential back edge of a seal 10, 11 is laid in this groove, the respective opposite, i.e. front, edge of a seal 10, 11 is configured as a sealing lip 13, which fits over the adjacent top or bottom side of the respective other ring 3, 2 and is elastically pressed against it.

Formed on a lateral surface of a ring 2, 3 facing away from the gap 4, in the present case on the outward-lying lateral surface 14 of outer ring 2, is a continuously circumferential, collar-like shoulder 15.

The collar-like shoulder 15 consists of two parts: joined directly to the lateral surface 14 is a continuously circumferential web 16, which merges at its periphery into a region 17 that is thickened in comparison to it. The radial extent of each of the two regions 16, 17 is smaller than the radial extent of the outer ring 2 to which they are connected, as well as that of the inner ring 3 to which they are not connected. The radial extent of the thickened region 17 is slightly smaller than the radial extent of the connecting web 16.

The thickness of the thickened region 17, measured parallel to the axis, is roughly equal to its radial extent, so its cross section can be described approximatively as square. By contrast, the thickness of the connecting web 16, measured parallel to the axis, is only about one-third the thickness of thickened region 17.

All the parts 16, 17 of shoulder 15, together with the ring 2 connected thereto, are made from a single piece of metal, for example by turning from an annular blank. The regions of transition of the connecting web 16 to the adjacent lateral surface 14 of the particular ring 2, on the one side, and to thickened region 17 on the other side, are fashioned with a relatively large radius of curvature, for example 1 mm or more, preferably 2 mm or more, particularly 3 mm or more.

The thickened region 17 at the periphery of the connecting web 16 serves, on the one hand, as a bracing ring that counteracts undesired deformation of the respective ring 2 even under heavy loading; on the other hand, it can also be used like a brake disk, in that, for example, two brake shoes are pressed against the particular surfaces 18 from above and below. Naturally, a plurality of such braking units can also be distributed at the periphery.

The free jacket surface 19 of thickened region 17 can be fashioned as smooth, or it can be provided with a structure.

The annular shoulder 15 is shifted away from the connecting surface 6 of the outer ring 2.

Embodiment 1' differs from the first embodiment by the fact that, inter alia, here there are more than one, specifically two, rows of (spherical) rolling elements 5', these being offset from each other in the axial direction.

Furthermore, here the shoulder 15' is disposed, not on the outer side of outer ring 2', but on the inner side 20 of inner ring 3'; here again, however, it has been shifted away from the connecting surface 7' of the respective ring 3' toward the opposite end face 21.

In addition, in this embodiment, disposed on the outer side 14' of outer ring 2' is a continuously circumferential tooth row 22 provided to engage with a pinion, worm or the like. This toothing 22 is located approximately at the height of shoulder 15'.

Figure 3:
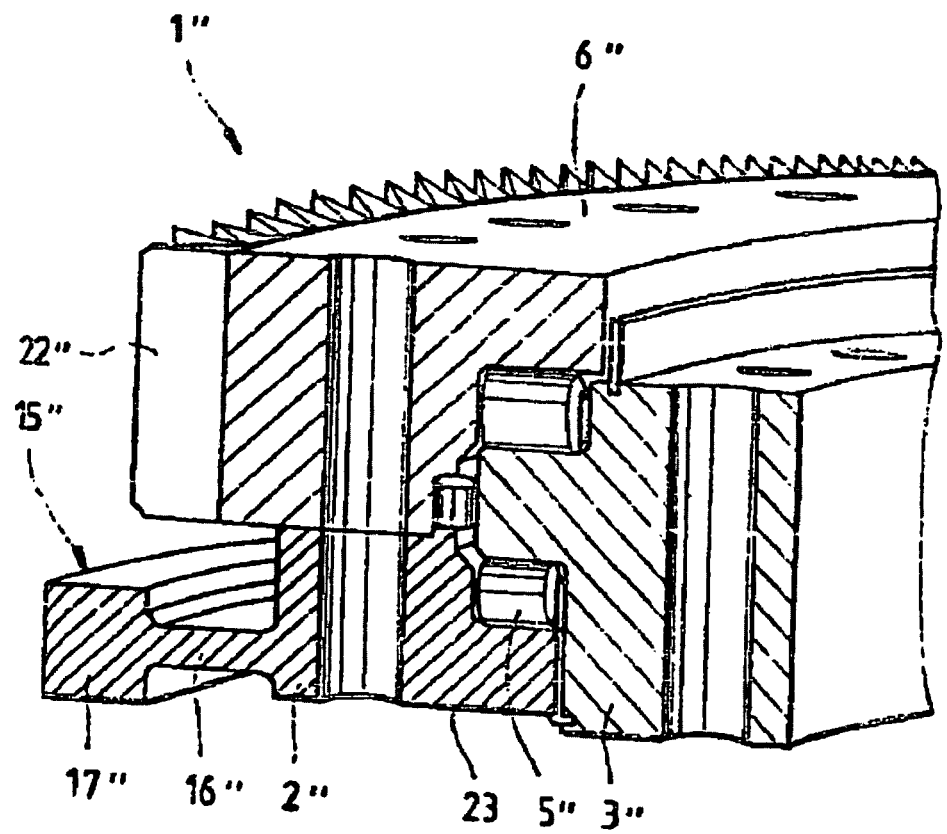
FIG. 3 is a representation analogous to FIG. 1 of a third embodiment of the invention.

Embodiment 1' has the particularity that a driving intervention must be effected at the toothing 22 of outer ring 2', whereas a braking intervention takes place at the shoulder 15' of inner ring 3'. A drive motor and a braking device must therefore be anchored to different, oppositely rotatable machine parts or system parts, which could create power feed problems. For this reason, in embodiment 1" according to FIG. 3, the shoulder 15" and the toothing 22" are provided on the same connecting element, namely outer ring 2", and are indeed offset from each other in the axial direction, i.e., approximately one above the other, but are separated by a spacing, so that a brake shoe placed on the shoulder 15" from above does not come into contact with the toothing 22". Here again, the shoulder 15" is shifted away from connecting surface 6" toward the opposite end face 23.

Finally, in this embodiment there is a total of three rolling-element rows, each with roller-shaped rolling elements 5". To facilitate assembly, the outer ring 2" is split in a horizontal plane.

The invention claimed is:

1. A rolling bearing device (1; 1'; 1") for rotatably coupling two coaxial annular connecting elements (2, 3), at least one of which is configured as a circular ring, and each of which has at least one annular surface that faces a corresponding surface of the other connecting element (2, 3), but is spaced apart therefrom by a gap (4), such that the connecting elements are rotatable in opposite directions about an axis of rotation at the centers of the two annular connecting elements (2, 3) and generally perpendicular to a ring plane, wherein disposed in the gap (4) between said two connecting elements (2, 3) is a rotary joint, comprising a single or multi-row rolling bearing, for absorbing axial and radial loads and tilting moments, and wherein provided in at least one end face (6, 7, 21, 23) of at least one of said two annular connecting elements (2, 3) are coronally arranged fastening means for securing the two connecting elements (2, 3) to a system part, and wherein, at least one of the two annular connecting elements (2, 3) comprises, on a surface (14, 20) facing away from the gap (4), a continuously circumferential, planar shoulder (15) having an oblong or elongated cross section and extending away from the gap (4) to a freely terminating, peripheral circumferential edge (19), wherein
   (a) said planar shoulder (15) has in the region of the peripheral circumferential edge (19) thereof a thickened region (17) that is connected, via a web (16) that is thinner than the circumferential edge (19), to the at least one of said two annular connecting elements (2, 3), wherein
   b) the gap (4) between the two annular connecting elements (2, 3) is sealed at both mouth regions, by at least one annular sealing element (10, 11).

2. A rolling bearing device (1; 1'; 1") for rotatably coupling two coaxial annular connecting elements (2, 3), at least one of which is configured as a circular ring, and each of which has at least one annular surface that faces a corresponding surface of the other connecting element (2, 3), but is spaced apart therefrom by a gap (4), such that the two connecting elements (2, 3) are rotatable in opposite directions about an axis of rotation at the centers of the two annular connecting elements (2, 3) and generally perpendicular to a ring plane, wherein disposed in the gap (4) between the two connecting elements (2, 3) is a rotary joint, configured as a single- or multi-row rolling bearing, for absorbing axial and radial loads and tilting moments, and wherein provided in at least one end face (6, 7, 21, 23) of at least one of the two connecting elements (2, 3) are coronally arranged fastening means for securing the two connecting elements (2, 3) to a system part, and wherein, at least one of the two annular connecting elements (2, 3) comprises, on a surface (14, 20) facing away from the gap (4), a continuously circumferential, planar shoulder (15) having an oblong or elongated cross section and extending away from the gap (4) to a freely terminating, peripheral circumferential edge (19), wherein
   (a) the planar shoulder (15) has, in the region of the peripheral circumferential edge (19), a thickened region (17) that is connected, via a web (16) that is thinner than the region (17), to the at least one of said two annular connecting elements (2, 3), wherein
   b) at least a portion of the planar shoulder (15), in the region near the peripheral circumferential edge (19), is configured as one or more rotationally symmetrical contact surface(s) (18) for brake shoes, and wherein
   c) the gap (4) between the two annular connecting elements (2, 3) is sealed along both mouth regions, by at least one annular sealing element (10, 11).

3. The device as in claim 1, wherein the radial distance between the peripheral circumferential edge (19) of the shoulder (15) and a nearest raceway for rolling elements (5) is smaller than the distance of said raceway from the axis of rotation of the rolling bearing device (1).

4. The device as in claim 1, wherein said planar shoulder (15) is configured in one piece with the at least one of said two annular connecting elements (2, 3).

5. The device as in claim 1, wherein said planar shoulder (15) is disposed on a jacket surface (14, 20) of the annular connecting element (2, 3) that faces away from the gap (4).

6. The device as in claim 1, wherein said planar shoulder (15) has the shape of a disk.

7. The device as in claim 1, wherein said planar shoulder (15) extends along a plane.

8. The device as in claim 1, wherein the plane of said planar shoulder (15) is intersected perpendicularly by the axis of rotation of said rolling bearing device (1).

9. The device as in claim 1, wherein two mutually opposite boundary surfaces (18) of the thickened region (17), disposed at top and bottom sides thereof, extend parallel to each other.

10. The device as in claim 9, wherein the two mutually opposite boundary surfaces of said web (16) connecting the thickened region (17) at the peripheral circumferential edge (19) to the annular connecting element (2, 3) extend parallel to each other.

11. The device as in claim 1, wherein lengths of cross sections of the thickened region (17 and of the web (16) are generally equal:

$$(I_{pB}-I_{St})/(I_{pB}+I_{St}) \leq k_1,$$

wherein
   $I_{pB}$=the radial length of the cross section of the thickened peripheral region;
   $I_{St}$=the radial length of the cross section of the web between the thickened peripheral region and the particular annular connecting element; and
   $k_1$=0.25–0.15.

12. The device as in claim 1, wherein the extent to which the annular connecting element (2, 3) is parallel to the longitudinal direction of the cross section of the thickened region (17) to which it is connected, is generally at least equal to or greater than a length of the thickened region (17):

$$I_{rA} \geq I_{pB}$$

wherein
   $I_{rA}$=the lengthwise extent to which the annular connecting element connected to the planar shoulder is parallel to the longitudinal direction of the cross section of said planar shoulder;
   $I_{pB}$=the radial length of the cross section of the thickened peripheral region.

13. The device as in claim 1, wherein the extent to which the at least one of said two annular connecting elements (2, 3) is parallel to the longitudinal direction of the cross section of the thickened region (17) to which it is connected is no more than equal to the length of the cross section of the planar shoulder (15):

$$k_2 \cdot I_{rA} \leq I_{fA}$$

wherein
   $I_{rA}$=the lengthwise extent to which the annular connecting element connected to the planar shoulder is parallel to the longitudinal direction of the cross section of said planar shoulder;
   $I_{fA}$=the length of the planar shoulder ($I_{fA}=I_{pB}+I_{St}$), wherein $I_{pB}$=the radial length of the cross section of the thickened peripheral region, and $I_{St}$=the radial length of the cross section of the web between the thickened peripheral region and the particular annular connecting element;
   $k_2$=0.85–0.95.

14. The device as in claim 1, wherein the thickened peripheral region (17) is 2-3 times as thick as the web (16) connecting the thickened peripheral region (17) to the at least one of said two annular connecting elements (2, 3).

15. The device as in claim 1, wherein in the regions of transition from the web (16) to the adjacent surface of the thickened region (17), on the one side, and/or of annular connecting element (2, 3), on the other side, the cross-sectional radii of curvature are 1 mm to 3 mm.

16. The device as in claim 1, wherein said two annular connecting elements (2, 3) are disposed radially one inside the other, in such that the gap (4) running between them is generally cylindrical.

17. The device as in claim 1, wherein the two end faces (6, 23; 7, 21) of the two annular connecting elements (2, 3) that are separated from each other by the gap (4) are offset from each other in the axial direction.

18. The device as in claim 1, wherein the height of each of said two annular connecting elements (2, 3), measured in the direction of the axis of rotation of said rolling bearing (1), is smaller than a respective thereto-parallel overall height of said rotary bearing.

19. The device as in claim 1, wherein each of the two annular connecting elements (2, 3) has an end face defining a preferred connecting surface (6, 7), the connecting surface (6, 7) of one of said two connecting elements (2, 3) being on a top side of said rotary joint (1), and the connecting surface (6, 7) of the other of said two connecting elements (2, 3) being on a bottom side of said rotary joint (1).

20. The device as in claim 19, wherein the distance of said planar shoulder (15) from the preferred connecting surface (6, 7) of the at least one of said two annular connecting elements (2, 3) to which said planar shoulder (15) is connected, measured in the direction of the axis of rotation of said rolling bearing (1), is at least equal to a distance of said planar shoulder (15) from the opposite end face (21, 23) of the at least one of said two connecting elements (2, 3).

21. The device as in claim 1, wherein at least a portion of said planar shoulder (15), in the region near the peripheral circumferential edge (19), is configured at least as one rotationally symmetrical contact surface (18) for brake shoes.

22. The device as in claim 1, wherein another one of said two annular connecting elements (2, 3) that is not joined in one piece to said planar shoulder (15), or a portion thereof that is separated from said planar shoulder, is provided with a circumferential toothing (22).

23. The device as in claim 22, wherein the toothing (22) is disposed on the surface (14, 20) of said rotary joint (1) facing away from said planar shoulder (15).

24. The device as in claim 22, wherein the toothing (22) is an axial distance from said planar shoulder (15).

25. The device as in claim 22, wherein the toothing (22) is displaced relative to said planar shoulder (15) in a radial direction backward toward one of said two annular connecting elements (2, 3) which is provided with the toothing (22).

26. The device as in claim 1, wherein the coronally arranged fastening means are configured as through-passing bores (8, 9).

27. The device as in claim 1, wherein at least one rolling bearing row is composed of ball-shaped rolling elements (5).

28. The device as in claim 27, wherein at least one rolling bearing row is provided with at least two rolling elements.

29. The device as in claim 28, wherein at least two rolling-element rows are offset from one other in an axial direction.

30. The device as in claim 28, wherein at least one rolling bearing row comprises a selected one of roller-, needle-, barrel- and cone-shaped rolling elements (5).

31. The device as in claim 1, wherein the gap (4) between the two annular connecting elements (2, 3) is sealed and is filled with a lubricant.

* * * * *